US010371855B2

(12) United States Patent
Catalano et al.

(10) Patent No.: US 10,371,855 B2
(45) Date of Patent: Aug. 6, 2019

(54) APPARATUS AND METHOD FOR NON-INVASIVE INSPECTION OF SOLID BODIES BY MUON IMAGING

(71) Applicant: ISTITUTO NAZIONALE DI ASTROFISICA, Rome (rm) (IT)

(72) Inventors: Osvaldo Catalano, Rome (IT); Paolo Conconi, Rome (IT); Giancarlo Cusumano, Rome (IT); Melania Del Santo, Rome (IT); Giovanni La Rosa, Rome (IT); Maria Concetta Maccarone, Rome (IT); Teresa Mineo, Rome (IT); Giovanni Pareschi, Rome (IT); Giuseppe Sottile, Rome (IT)

(73) Assignee: ISTITUTO NAZIONALE DI ASTROFISICA, Rome (RM) (IT)

( * ) Notice: Subject to any disclaimer, the term of this patent is extended or adjusted under 35 U.S.C. 154(b) by 0 days.

(21) Appl. No.: 15/778,580

(22) PCT Filed: Nov. 17, 2016

(86) PCT No.: PCT/IB2016/056937
§ 371 (c)(1),
(2) Date: May 23, 2018

(87) PCT Pub. No.: WO2017/089932
PCT Pub. Date: Jun. 1, 2017

(65) Prior Publication Data
US 2018/0356554 A1      Dec. 13, 2018

(30) Foreign Application Priority Data

Nov. 23, 2015   (IT) .......................... UB2015A005808

(51) Int. Cl.
*G01V 5/00*          (2006.01)

(52) U.S. Cl.
CPC ............ *G01V 5/005* (2013.01); *G01V 5/0016* (2013.01)

(58) Field of Classification Search
CPC .......................... G01V 5/0016; G01V 5/0075
See application file for complete search history.

(56) References Cited

U.S. PATENT DOCUMENTS 5,693,968 A * 12/1997 Cherry .............. H01L 27/14831
257/231
6,518,580 B1 * 2/2003 van Bibber ............... G01T 1/22
250/397

(Continued)

FOREIGN PATENT DOCUMENTS

JP      2007-271400 A      10/2007
JP      2010-101892 A       5/2010

OTHER PUBLICATIONS https://en.wikipedia.org/wiki/Cherenkov_radiation. Downloaded Oct. 17, 2018.*

(Continued)

*Primary Examiner* — Wyatt A Stoffa
(74) *Attorney, Agent, or Firm* — Hedman & Costigan, P.C.; James V. Costigan; Kathleen A. Costigan

(57) ABSTRACT

An apparatus for non-invasive inspection of solid bodies by muon imaging, comprising a receiver (3) adapted to intercept a muon flux associated with cosmic rays passing through a portion of a body to be inspected, sensor means (4) adapted to detect the amount of photons or Cherenkov radiation associated with the intercepted muon flux, electronic processing means adapted to reconstruct energy and direction of the muon flux incident the portion of the body to be inspected to calculate the local density thereof. The receiver (3) comprises an optical device (5) provided with at least one receiving surface (6) having reflecting and/or diffractive properties adapted to convey the Cherenkov (Continued)

radiation associated with muons toward the sensor means (4), these latter comprising a multipixel detection chamber (8) adapted to provide an annular image of the muon having radius and position variable as a function of the energy and direction of muon flux.

10 Claims, 2 Drawing Sheets

(56) References Cited

U.S. PATENT DOCUMENTS

| | | | | |
|---|---|---|---|---|
| 7,601,965 B1* | 10/2009 | Bell | ............... | G01V 5/0075 |
| | | | | 250/390.11 |
| 7,897,925 B2* | 3/2011 | Goldberg | ............... | G01T 1/2935 |
| | | | | 250/251 |
| 9,939,550 B2* | 4/2018 | Clayton | ............... | G01V 5/0091 |
| 2009/0224157 A1* | 9/2009 | Goldberg | ............... | G01T 1/2935 |
| | | | | 250/358.1 |
| 2011/0035151 A1 | 2/2011 | Botto | | |
| 2014/0270034 A1* | 9/2014 | Clayton | ............... | G01V 5/0091 |
| | | | | 376/154 |
| 2015/0212014 A1* | 7/2015 | Sossong | ............... | G01V 5/0016 |
| | | | | 250/394 |

OTHER PUBLICATIONS

O. Catalano et al., "Volcanoes Muon Imaging Using Cherenkov Telescopes", Nuclear Instruments & Methods in Physics Research, Section A: Accelerators, Spectrometers, Detectors, and Associated Equipment, vol. 807, pp. 5-12 available online Nov. 24, 2015.

Osvaldo Catalano et al., "Osvasldo Catalano—9th ASTRI Collaboration Meeting, Feb. 23-26, 2015, Volcanoes Muon Imaging Using the ASTRI Cherenkov Prototype" Feb. 26, 2015 (retrieved from the Internet: URL:http://astri.iasfbo.inaf.it/events/talks/catalano_muon_bologna.pdf [retrieved on May 15, 2017] Slides 3-5 and 7-16.

Heinrich J. Volk et al., "Imaging Very High Energy Gamma-Ray Telescopes", Experimental Astronomy, vol. 25, No. 1-3, pp. 173-191, Mar. 10, 2009.

O. Catalano et al., "Volcanoes Muon Imaging Using Cherenkov Telescopes", Nuclear Instruments & Methods in Physics Research, Section A: Accelerators, Spectrometers, Detectors, and Associated Equipment, Preprint submitted to Nuclear Physics A Nov. 6, 2015.

International Search Report from PCT/IB2016/056937 filed Nov. 17, 2016, dated May 24, 2017.

Written Opinion of the International Searching Authority from PCT/IB2016/056937 filed Nov. 17, 2016, dated May 24, 2017.

English Abstract for JP 2010-101892 A dated May 6, 2010.
English Abstract for JP 2007-271400 A dated Oct. 18, 2007.

* cited by examiner

APPARATUS AND METHOD FOR NON-INVASIVE INSPECTION OF SOLID BODIES BY MUON IMAGING

TECHNICAL FIELD

The present invention has application in the technical field of measuring instruments and it relates to an apparatus for non-invasive inspection of solid bodies by muon imaging usable in civil engineering, archeology, volcanology, tectonics and everywhere a radiographic and/or tomographic non-destructive inspection of geological and/or engineering structures, even of large dimensions, is necessary.

The invention further relates to a method for non-invasive inspection by muon imaging implementable by said apparatus.

PRIOR ART

Tomographic investigations based on "tracking" techniques are known which exploit the detection of energy associated to charged particles of cosmic rays passing through a material to be investigated such to perform non-invasive inspections.

Such techniques are based on displaying the trajectory of the particle that while passing through detection planes, usually scintillating planes, produce an electric pulse that, once suitably analysed, gives the direction of origin of the particle.

The interaction of the primary cosmic ray (hadrons and gamma photons) with the atoms of the atmosphere generates a shower of other particles, among which many pions that decay very quickly into muons, highly penetrating particles.

The latter, since having a longer decay time and mainly interacting with the matter through Coulombic force, are able to reach the earth surface giving rise to a isotropic flux of penetrating charged radiation that at the sea level is about 1 muon per square centimeter per minute.

The muon "tracking" techniques for radiography/tomography of massive objects exploit the high penetrability of muons and their contemporaneous energy loss through the electromagnetic interactions in the crossed material, since energy absorption depends on thickness and density of the crossed material and on energy of the incident muon.

Therefore the outgoing muon has energy lower than the incident one and moreover it deflects from the original direction due to many small angle deflections occurring when crossing (Coulomb scattering).

Moreover the mean deflection angle is proportional to the inverse of momentum of the particle and to the square root of the real density of the material measured in radiation lengths.

Therefore by measuring the muon flux attenuation as a function of the amount of matter crossed in different directions it is possible to determine the distribution density in the investigated material.

The known geophysical survey techniques, particularly used in volcanology field, provide to use telescopes with scintillator bars read by light detectors such as photomultipliers or silicon photomultipliers that intercept the muons coming out from the volcano, such as described for example in JP20060096285.

However the signal produced by such instruments is affected by the effect of accidental coincidences, for example due to low energy particles that contemporaneously hit the telescope planes simulating an event, and above all the so called back-flux that is the flux arriving from the direction opposite to the one passing through the examined material.

Moreover such instruments do not provide information about energy spectrum of indecent muons that has to be known for calculating the integrated flux model through the body to be compared with observed data.

Some instruments tried to limit the back-flux by inserting up to six scintillator planes between lead and iron absorber planes. This solution has considerably decreased, even if not completely, the non-coherent muon background, but it has also increased too much the weight of the instrument limiting its transportability and compactness. JP2010101892 describes a measuring techniques applied in the volcanology field based on detecting muon tracks passing through scintillator plane endoscopes. However such technique requires many detection layers and a resolution time high enough to reduce the level of false positives due to the inevitable background particles.

DISCLOSURE OF THE INVENTION

The object of the present invention is to overcome the above mentioned drawbacks, by providing an apparatus for non-invasive inspection of solid bodies by muon imaging that is particularly efficient and quite cheap.

A particular object is to provide an apparatus for non-invasive inspection of solid bodies by muon imaging allowing radiography and/or tomography of structures, even of large dimensions, to be reliably carried out, while minimizing errors and while taking considerably less time than known techniques.

Still another object is to provide an apparatus for non-invasive inspection of solid bodies by muon imaging having considerably reduced encumbrances and weights such to be possibly transported and such to allow radiography and/or tomography investigations of large bodies, such as volcanoes, in a rapid and reliable manner.

Still another object is to provide an apparatus for non-invasive inspection of solid bodies by muon imaging that is flexible to be used.

A further object is to provide a method for non-invasive inspection of solid bodies by muon imaging that is particularly reliable and cheap and that allows systemic errors and false positives to be minimized.

Such objects, as well as other objects that will be more evident below, are achieved by an apparatus for non-invasive inspection of solid bodies by muon imaging that, according to claim 1, comprises a receiver adapted to intercept a Cherenkov radiation from a muon flux associated with cosmic rays passing through a portion of a body to be inspected, sensor means adapted to detect the amount of photons or Cherenkov radiation associated with the muon flux, electronic processing means adapted to reconstruct energy and direction of the muon flux incident the portion of the body to be inspected to calculate the local density thereof.

The receiver comprises an optical device provided with at least one receiving surface having reflecting and/or diffractive properties adapted to convey the Cherenkov radiation associated with muons toward said sensor means.

Sensor means in turn comprise a multipixel detection chamber adapted to provide an annular image of the muon having radius and position variable as a function of the energy and direction of the muon flux.

By means of such combination of characteristics it will be possible to use an instrument extremely more simple and reliable than those used for muon tracking techniques to obtain density measurements.

Moreover the investigation is based on the analysis and reconstruction of the Cherenkov ring image, that is a well-established and efficient technique. The measurement of the muon energy allows also the absorption inside the object to be evaluated and therefore allows the real path of the muon inside the object to be efficaciously determined.

A further advantage is the fact that no active elements are required for detecting the muon, such as for example plastic scintillators, since atmosphere is the muon-Cherenkov photons conversion medium.

Advantageously said detection chamber can be arranged at the focal plane of said receiver optical device.

The optical device can comprise a primary receiving surface intended to convey the flux of Cherenkov photons toward said focal plane.

Moreover the optical device can be of the type with double reflection and/or diffraction with a secondary receiving surface facing and aligned with said primary receiving surface for transferring the flux of photons received by the latter and for concentrating it toward said detection chamber facing said secondary reflecting or diffractive surface.

Thus the Cherenkov signal produced by the muon will be directional and highly collimated and it will be possible to eliminate the back-flux produced by the other muons generated in the atmosphere that inevitably would contribute to false coincidences.

Only the muons arriving from the receiving surface of the optical device within an angle of 1,3°, that is the angular size of the radiation cone of the Cherenkov photon, with respect to the optical axis will be able to generate a Cherenkov ring in the focal plane of the optical device.

Opportunely the apparatus can comprise a plurality of said optical devices associated to respective sensor means and to respective electronic processing means to detect muon fluxes coming from different directions, at least one of said optical devices being movable to vary its detection direction.

Thus it will be possible to arrange the planes of detection of the muon flux about the material body under examination to perform 3D tomography.

According to another aspect of the invention there is provided a method for non-invasive inspection of solid bodies by muon imaging according to claim 9 having all the above advantages.

Advantageous embodiments of the invention are obtained according to the dependent claims.

BRIEF DESCRIPTION OF THE DRAWINGS

Further characteristics and advantages of the invention will be more clear from the detailed description of a preferred but non-exclusive embodiment of an apparatus for non-invasive inspection of solid bodies by muon imaging according to the invention, shown by way of a non-limitative example by the help of the annexed drawing tables wherein.

DETAILED DESCRIPTION OF A PREFERRED EMBODIMENT

With reference to the annexed figures they show a preferred but not exclusive configuration of an apparatus for non-invasive inspection of solid bodies by muon imaging.

Figure 1:
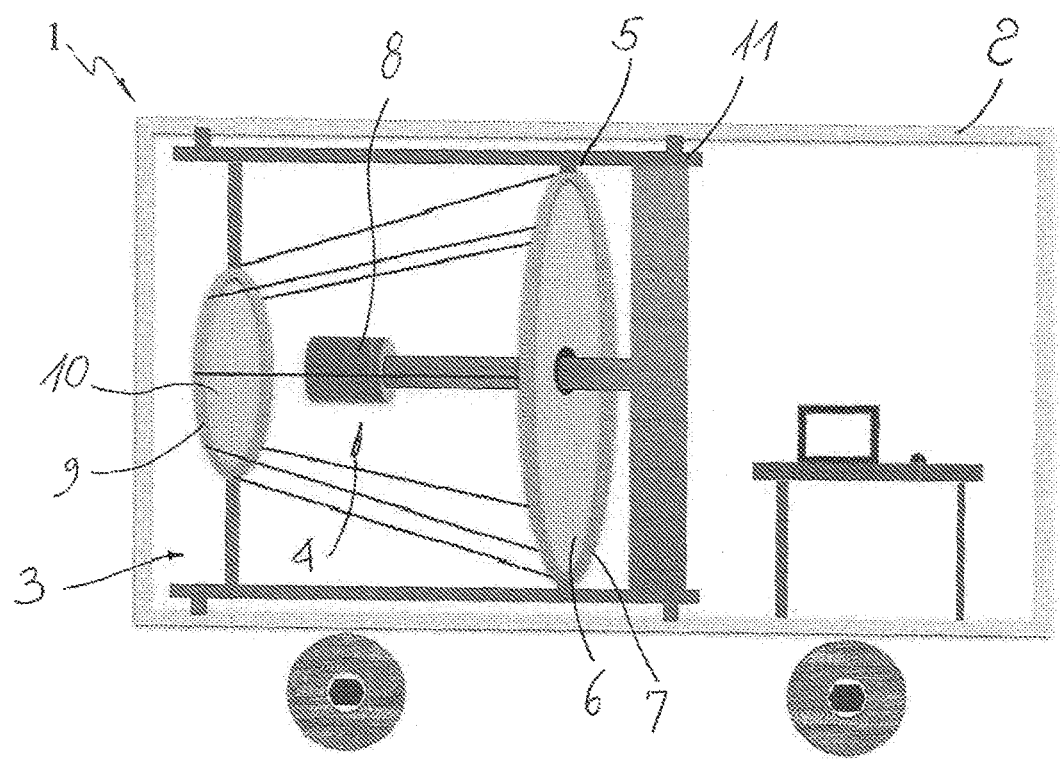
FIG. 1 is a schematic view of an apparatus according to the invention.

Particularly FIG. 1 schematically shows a preferred arrangement of an apparatus of the movable type, generally denoted by 1, namely mounted into a movable structure 2 such to be easily transported and placed in different detection areas. The apparatus 1 thus can be used both for 2D radiography and 3D tomography, possibly in a system comprising two or more apparatuses according to the invention, not necessarily similar to each other.

The apparatus 1 essentially comprises a receiver 3 adapted to intercept a Cherenkov radiation from a muon flux associated with cosmic rays passing through a portion of a body to be inspected, sensor means 4 adapted to detect the amount of Cherenkov radiation associated with the muon flux and electronic processing means, not visible since they are embedded into the mechanical structure of the sensor means, adapted to reconstruct energy and direction of the muon flux incident the portion of the body to be inspected to calculate the local density thereof.

The receiver 3 comprises an optical device 5 provided with at least one receiving surface 6 having reflecting properties adapted to convey the Cherenkov radiation associated with muons toward the sensor means.

Particularly the reflecting surface 6 belongs to a mirror 7 suitably designed for intercepting the Cherenkov radiation from a muon flux and to direct it towards the sensor means 4. These latter comprise a multipixel detection chamber 8 arranged at the focal plane of the receiving optical device 5 and adapted to provide an annular image of the muon having radius and position variable as a function of the energy and direction of muon flux.

Figure 2:
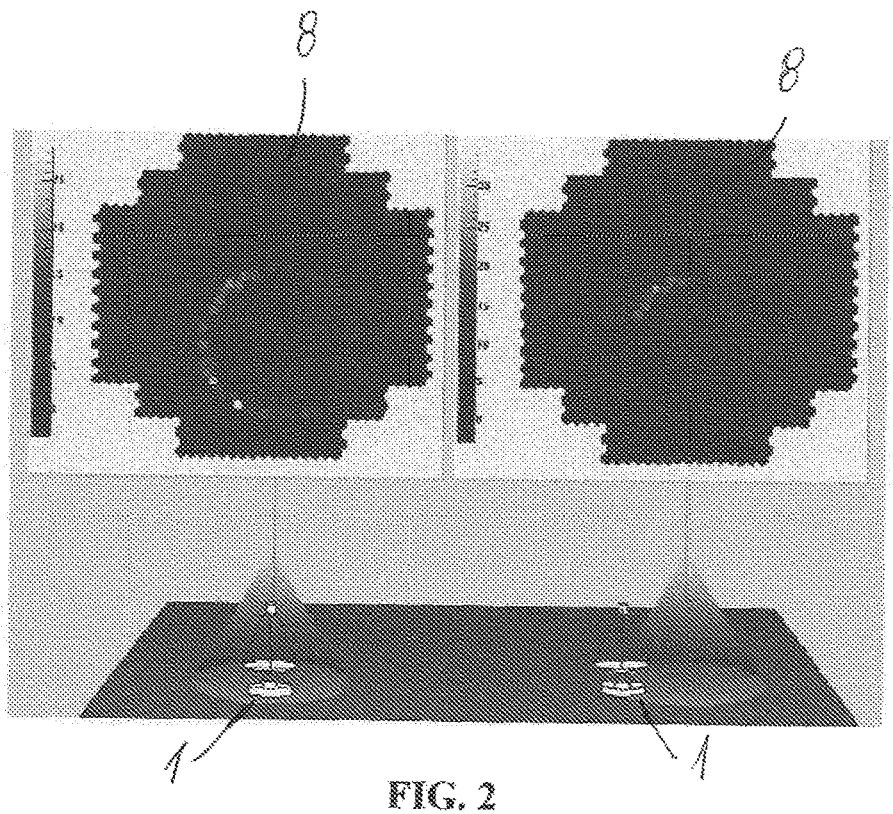
FIG. 2 is the image of a muon generated by the apparatus in two different impact conditions of the muon.

FIG. 2 shows the typical annular image of a muon as processed by a multipixel chamber 8. Particularly the image on the left shows the case when a muon impacts the receiving surface, while the image on the right shows the case when the impact point of the muon is outside the receiving surface.

According to the preferred but not exclusive shown configuration the optical device 5 is of the double-mirror type, with a primary mirror 7 and a secondary mirror 9 having respective reflecting surfaces.

The primary reflecting receiving surface 6 is intended to intercept the flux of Cherenkov photons and to convey it on the secondary reflecting surface 10 facing and aligned with the primary receiving surface 6.

The sensor means 4 are interposed between the two reflecting surfaces 6, 10 with the relevant detection chamber 8 facing the secondary reflecting surface 10 such to obtain the alignment of the focal plane.

Such alignment can be obtained by a suitable mechanical support structure 11 that allows the mirrors 7, 9 and the chamber 8 to be mutually fastened in addition to allow the apparatus 1 to be fastened to the holding structure 2.

The secondary receiving surface 10 of the reflecting type thus can transfer the flux of photons received by the primary surface 6 and concentrate it towards the detection chamber 8 facing it.

Figure 3:
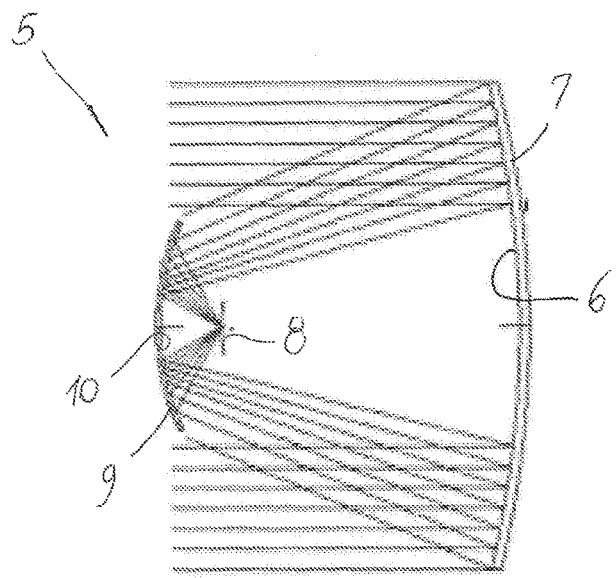
FIG. 3 is a schematic view of an optical device belonging to the apparatus according to a preferred configuration.

The specific configuration of the optical device 5 can be selected depending on resolution needs and also on space needs. FIG. 3 schematically shows a possible configuration of the Schwarzschild-Couder type wherein the two receiving surfaces 6, 10 are defined by two aspheric mirrors 7, 9 designed to correct spherical aberrations and coma.

Such configuration allows an observational focus range to be provided between 10° and 15° and preferably close to 12°, such to have a greater resolution.

Moreover such configuration allows the dimensions of the chamber 8 to be considerably reduced, while making the dimensions of the pixels of the focal plane consistent with modern photon detectors like SiPMs.

In an exemplificative form the primary mirror 7 can be composed of 8 segments forming a primary reflecting surface 6 with a diameter of 2100 mm. The secondary mirror 9 is monolithic with a diameter of 800 mm. The distance between the primary mirror 7 and the secondary mirror 9 is 1600 mm, with the chamber 8 placed at a distance of 275 mm from the secondary mirror 9.

Simulations performed with the optical design software ZEMAX shows that in such configuration 80% of photons are concentrated within a range of 2.8 mm.

Figure 4:
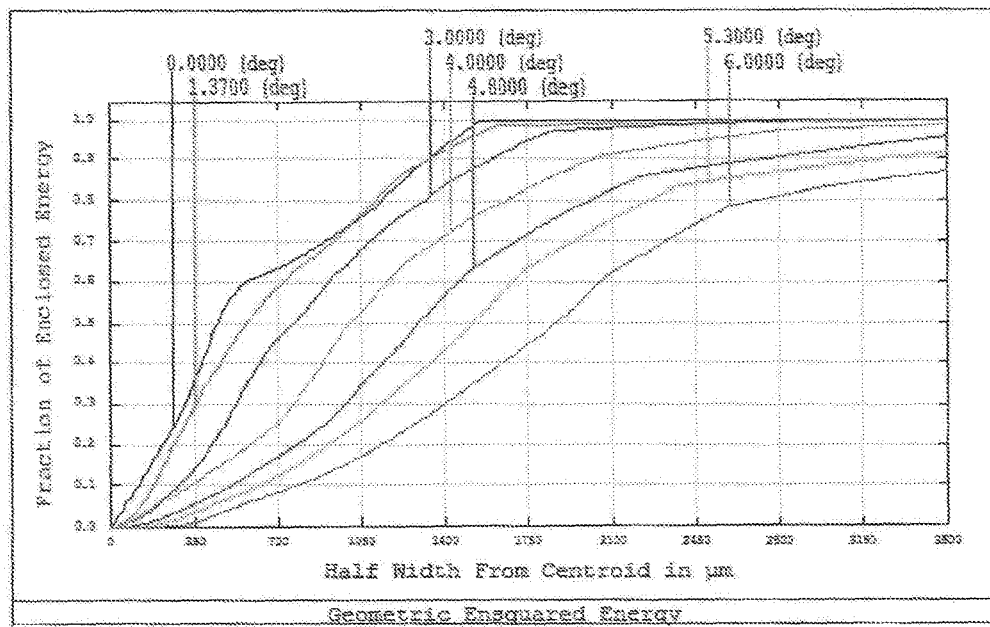
FIG. 4 is a graph about the spot diagram and fraction of photons enclosed in the image for some angles of the focus range as a function of the radius measured with respect to the center of the image.

FIG. 4 shows some graphs about the spot diagram and the fraction of photons enclosed in the image for some angles of the focus range as a function of the linear dimension (radius) measured with respect to the center of the image.

The Schwarzschild-Couder configuration has the advantage of reducing encumbrances and of obtaining a high collimation but it is not an exclusive configuration.

For example it is possible to use Fresnel lenses, also made of plastic material, with the advantage of further reducing the weight of the apparatus 1, improving the transportability thereof.

According to alternative, not shown, configurations the receiving surfaces 6,10 can be of the diffractive type. Particularly instead of mirrors 7, 9 it is possible to use two suitably designed lenses to convey the muon flux towards a focal plane where the chamber 8 will be arranged.

Particularly the sensor means 4 with the relevant detection chamber 8 will be placed at the focus of the secondary lens.

Hybrid configurations are also possible, wherein a receiving surface is a reflecting mirror while the other one is a refractive lens.

Regardless of the specific configuration employed for the optical device 5, the apparatus 1 can be composed of a system provided with a plurality of optical devices associated to respective sensor means and respective electronic processing means to detect muon fluxes coming from different directions, such to carry out 3D tomography.

The optical devices have not to be necessarily of the same type and preferably at least one of them can be inserted in a movable structure, possibly autonomous from an energy perspective, to vary its detection direction.

As regards the characteristics of the sensors means 4 the multiplex chamber 8 can comprise photon sensors of the siPm type, photomultipliers or the like intended to generate analog signals as a function of the incident photon and of the direction of the muon flux to be sent to electronic processing means that provide to convert them into digital signals by a suitable processing unit.

Particularly the electronic processing means are intended to detect the signal of Cherenkov radiation and to carry out an analysis intended to measure the differential attenuation and the energy of the muon flux passing through the portion inspected along different directions and thus to determine the local density of the inspected body.

The detection chamber 8 is essentially composed of a mechanical structure, whose main function is to contain all the electronic components, and the real electronic components, among which the voltage distribution module, detectors, image processor and command and data communication module.

In an exemplificative manner the mechanical structure of the detection chamber 8 has a cylindrical shape with diameter size of 300 mm and height size of 300 mm and it opportunely comprises a transparent window for reflected or diffracted photons to enter and a mechanical interface flange for the connection to the support structure 11 of the optical device 5.

The electronics of the chamber 8 comprises SiPM sensors, front-end electronics and back-end electronics.

The main role of front-end electronics is to process analog signals of SiPMs into digital signals, while back-end electronics manages and controls the overall behavior of the system, including the reading and management of data by a FPGA (Field Programmable Gate Array).

The back-end electronics further provides all the functions necessary to process and transmit to an external computer the whole stream of data including status information of the system such as for example, temperatures and voltages.

The focal plane of the chamber 8 is of the modular type, for example composed of 16 modules of dimensions 57 mm*57 mm*30 mm. Each module contains the board with SiPMs (8 pixels*8 pixels), the ASIC board reading and processing the signals of SiPMs and the FPGA board controlling and managing all the operating functions of the front-end electronics. Boards of each module can be mechanically fastened to a metal casing, for example made of aluminium, and connected with each other by means of connectors. The 16 modules are geometrically arranged in a grid containing 4*4 modules and will be mechanically fastened to an aluminium support for a 228 mm*228 mm dimension.

The back-end electronics is the system processor and has to be able to receive and process data at a speed higher than that of the triggered events. Back-end electronics is based on a FPGA that controls and monitors the stream of data and commands for/to the electronics of the focal plane.

A voltage distribution board provides necessary voltages to the different modules by using a single input voltage of 24 V. The board provides to independently enable/disable each sub-system connected thereto.

There is also provided a data acquisition system, for example a portable PC connected to the back-end board through a Ethernet cable from which commands are sent and data are received.

However it is clear that the chamber 8 can be designed also in a different manner, for example with a different number of modules and/or with a different arrangement in the space thereof, without departing from the scope of protection of the present invention.

From what disclosed above it is clear that the apparatus and the method according to the invention achieve the above mentioned objects.

The apparatus and the method according to the invention are susceptible of many changes and variants, all falling within the inventive teaching disclosed in the annexed claims. All the details can be replaced by other technically equivalent elements, and the materials can be different depending on needs, without departing from the scope of protection of the present invention.

Even if the apparatus and the method have been described with a particular reference to the annexed figures, the reference numerals used in the description and in the claims are used to improve the comprehension of the invention and do not constitute any limitation to the scope of protection claimed.

The invention claimed is:

1. An apparatus for non-invasive inspection of solid bodies by muon imaging, comprising:
   a receiver (3) adapted to intercept Cherenkov radiation from a muon flux associated with cosmic rays passing through a portion of a body to be inspected;
   a sensor unit (4) adapted to detect the amount of Cherenkov radiation associated with the muon flux;
   electronic processing unit adapted to reconstruct energy and direction of the muon flux incident the portion of the body to be inspected to calculate the local density thereof;
   wherein said receiver (3) comprises an optical device (5) provided with at least one receiving surface (6) having reflecting and/or diffractive properties adapted to convey the Cherenkov radiation associated with muons toward said sensor unit (4), said sensor unit (4) comprising a multipixel detection chamber (8) adapted to provide an annular image of the muon having radius and position variable as a function of energy and direction of muon flux, and wherein said optical device (5) comprises double reflection and/or diffraction lenses with a secondary receiving surface (10) facing and aligned with said primary receiving surface (6) for transferring the flow of photons received by said primary receiving surface and for concentrating the flow of electrons towards said detection chamber (8) facing said secondary receiving surface (10).

2. Apparatus as claimed in claim 1, characterized in that said detection chamber (8) is arranged at the focal plane of said receiving optical device (5).

3. Apparatus as claimed in claim 1, characterized in that said optical device (5) comprises a primary receiving surface (6) adapted to convey the flow of Cherenkov photons towards said focal plane.

4. Apparatus as claimed in claim 1, characterized in that said optical device (5) is designed to have a focus range between 10° and 15°.

5. Apparatus as claimed in claim 1, characterized by comprising a plurality of said optical devices associated with a respective sensor unit and a respective electronic processing unit to detect muon fluxes coming from different directions, at least one of said optical devices being movable to vary its detection direction.

6. Apparatus as claimed in claim 1, characterized in that said multipixel chamber (8) comprises photon sensors of the SiPM type, photomultipliers that generate analog signals as a function of the energy and the direction of muon flux, said electronic processing unit comprising a processing unit programmed to transform said analog signals into digital signals.

7. Apparatus as claimed in claim 6, characterized in that said electronic processing unit detects the signal of the Cherenkov radiation and performs an analysis for measuring the differential attenuation and the energy of the muon flux passing through the portion inspected along different directions and determines the local density of the inspected body.

8. Apparatus as claimed in claim 1, characterized in that said optical device (5) is designed to have a focus range of 12°.

9. A method for non-invasive inspection of solid bodies by muon imaging, comprising the following steps:
   a. intercepting a Cherenkov radiation from a muon flux associated with cosmic rays passing through a portion of a body to be inspected along at least one detection plane;
   b. detecting the amount of Cherenkov radiation associated with the intercepted muon flux to define an annular image of the muon;
   c. transferring and concentrating the Cherenkov radiation towards a detection chamber by double reflection and/or diffraction;
   d. electronic processing of the detected Cherenkov radiation to reconstruct energy and direction of the muon flux incident the portion of the body to be inspected to calculate the energy and the direction of the muon flux as a function of the radius and the position of said annular image and measure the local density of the inspected body as a function of the calculated energy and direction.

10. Method as claimed in claim 9, characterized in that the Cherenkov radiation from a muon flux is intercepted along a plurality of detection planes to perform a 3D tomography of the body to be inspected.

* * * * *